(12) United States Patent  (10) Patent No.: US 9,055,332 B2
Westin  (45) Date of Patent: Jun. 9, 2015

(54) LIP SYNCHRONIZATION IN A VIDEO CONFERENCE

(75) Inventor: Patrik Westin, Stockholm (SE)

(73) Assignee: GOOGLE INC., Mountain View, CA (US)

(*) Notice: Subject to any disclaimer, the term of this patent is extended or adjusted under 35 U.S.C. 154(b) by 897 days.

(21) Appl. No.: 13/281,092

(22) Filed: Oct. 25, 2011

(65) Prior Publication Data
US 2012/0098923 A1 Apr. 26, 2012

Related U.S. Application Data

(60) Provisional application No. 61/406,799, filed on Oct. 26, 2010.

(30) Foreign Application Priority Data

Oct. 26, 2010 (EP) .................................. 10188901

(51) Int. Cl.
H04N 7/14 (2006.01)
H04N 21/44 (2011.01)
H04N 7/15 (2006.01)
H04N 21/234 (2011.01)
H04N 21/236 (2011.01)
H04N 21/434 (2011.01)

(52) U.S. Cl.
CPC ......... *H04N 21/44016* (2013.01); *H04N 7/152* (2013.01); *H04N 21/23424* (2013.01); *H04N 21/23608* (2013.01); *H04N 21/4344* (2013.01)

(58) Field of Classification Search
USPC ................. 348/14.01, 14.12, 14.09, 14.08
See application file for complete search history.

(56) References Cited

U.S. PATENT DOCUMENTS 3,381,273 A 4/1968 Stark et al.
5,778,082 A 7/1998 Chu et al.
5,801,756 A 9/1998 Iizawa
(Continued)

FOREIGN PATENT DOCUMENTS

WO  2008066593 A2  6/2008
WO  WO2010059481  5/2010
(Continued)

OTHER PUBLICATIONS

Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.
Overview; VP7 Data Format and Decoder. Version 1.5. On2 Technologies, Inc. Dated Mar. 28, 2005.
(Continued)

Primary Examiner — Olisa Anwah
(74) Attorney, Agent, or Firm — Young Basile Hanlon & MacFarlane P.C.

(57) ABSTRACT

Disclosed herein is a method of synchronizing of a plurality of data streams having time-stamped packets, wherein the plurality of data streams are of a first type and at least a second type different than the first type, of which at least one stream of the first type is to be processed at a server. The method includes re-dating a timestamp of a packet, using a processor, based on an estimated relative delay for transport up to the server between first-type and second-type streams and a predicted relative delay representative of a processing time duration between first-type and second-type streams, thereby allowing the relative delays to cancel at least partially.

20 Claims, 5 Drawing Sheets

(56) References Cited

U.S. PATENT DOCUMENTS

| | | |
|---|---|---|
| 5,914,949 A | 6/1999 | Li |
| 5,936,662 A | 8/1999 | Kim et al. |
| 5,953,050 A | 9/1999 | Kamata et al. |
| 5,963,547 A | 10/1999 | O'Neil et al. |
| 6,011,868 A | 1/2000 | van den Branden et al. |
| 6,028,639 A | 2/2000 | Bhatt et al. |
| 6,072,522 A | 6/2000 | Ippolito et al. |
| 6,163,335 A | 12/2000 | Barraclough |
| 6,453,336 B1 | 9/2002 | Beyda et al. |
| 6,603,501 B1 | 8/2003 | Parry et al. |
| 6,614,936 B1 | 9/2003 | Wu et al. |
| 6,621,514 B1 | 9/2003 | Hamilton |
| 6,658,618 B1 | 12/2003 | Gu et al. |
| 6,757,259 B1 | 6/2004 | Hamilton |
| 6,775,247 B1 | 8/2004 | Shaffer et al. |
| 6,795,863 B1 | 9/2004 | Doty, Jr. |
| 6,941,021 B2 | 9/2005 | Goldstein et al. |
| 6,992,692 B2 | 1/2006 | Gu et al. |
| 7,007,098 B1 | 2/2006 | Smyth et al. |
| 7,084,898 B1 * | 8/2006 | Firestone et al. .......... 348/14.09 |
| 7,123,696 B2 | 10/2006 | Lowe |
| 7,133,362 B2 | 11/2006 | Chu et al. |
| 7,143,432 B1 | 11/2006 | Brooks et al. |
| 7,206,016 B2 | 4/2007 | Gu |
| 7,253,831 B2 | 8/2007 | Gu |
| 7,321,384 B1 | 1/2008 | Wu et al. |
| 7,349,944 B2 | 3/2008 | Vernon et al. |
| 7,352,808 B2 | 4/2008 | Ratakonda et al. |
| 7,477,282 B2 | 1/2009 | Firestone et al. |
| 7,558,221 B2 | 7/2009 | Nelson et al. |
| 7,593,031 B2 | 9/2009 | Root et al. |
| 7,619,645 B2 | 11/2009 | Cockerton |
| 7,627,886 B2 | 12/2009 | Barbanson et al. |
| 7,646,736 B2 | 1/2010 | Yang et al. |
| 7,664,057 B1 | 2/2010 | Wu et al. |
| 7,698,724 B1 | 4/2010 | Day |
| 7,707,247 B2 | 4/2010 | Dunn et al. |
| 7,716,283 B2 | 5/2010 | Thukral |
| 7,759,756 B2 | 7/2010 | Lee et al. |
| 7,856,093 B2 | 12/2010 | Fujimori et al. |
| 7,864,251 B2 | 1/2011 | Gu et al. |
| RE42,288 E | 4/2011 | Degioanni |
| 7,920,158 B1 | 4/2011 | Beck et al. |
| 7,973,857 B2 | 7/2011 | Ahmaniemi et al. |
| 7,987,492 B2 | 7/2011 | Liwerant et al. |
| 8,010,652 B2 | 8/2011 | Wang et al. |
| 8,060,608 B2 | 11/2011 | Wang et al. |
| 8,117,638 B2 | 2/2012 | Perlman |
| 8,164,618 B2 | 4/2012 | Yang et al. |
| 8,228,982 B2 | 7/2012 | Qian et al. |
| 8,264,521 B2 | 9/2012 | Triplicane et al. |
| 8,265,168 B1 | 9/2012 | Masterson et al. |
| 8,276,195 B2 | 9/2012 | Hegde et al. |
| 8,379,677 B2 | 2/2013 | Leung et al. |
| 8,527,649 B2 | 9/2013 | Wexler et al. |
| 8,549,571 B2 | 10/2013 | Loher et al. |
| 8,588,280 B2 | 11/2013 | Oh et al. |
| 2001/0042114 A1 | 11/2001 | Agraharam et al. |
| 2002/0033880 A1 | 3/2002 | Sul et al. |
| 2002/0118272 A1 | 8/2002 | Bruce-Smith |
| 2003/0091000 A1 | 5/2003 | Chu et al. |
| 2003/0160862 A1 | 8/2003 | Charlier et al. |
| 2004/0119814 A1 | 6/2004 | Clisham et al. |
| 2005/0008240 A1 | 1/2005 | Banerji et al. |
| 2005/0062843 A1 | 3/2005 | Bowers et al. |
| 2005/0140779 A1 | 6/2005 | Schulz et al. |
| 2006/0023644 A1 | 2/2006 | Jang et al. |
| 2006/0164552 A1 | 7/2006 | Cutler |
| 2007/0005804 A1 | 1/2007 | Rideout |
| 2007/0035819 A1 | 2/2007 | Bahatt et al. |
| 2007/0081794 A1 | 4/2007 | Baynger et al. |
| 2007/0120971 A1 | 5/2007 | Kennedy |
| 2007/0127671 A1 | 6/2007 | Chua et al. |
| 2007/0200923 A1 | 8/2007 | Eleftheriadis et al. |
| 2007/0206091 A1 | 9/2007 | Dunn et al. |
| 2007/0280194 A1 | 12/2007 | Wu et al. |
| 2007/0294346 A1 | 12/2007 | Moore et al. |
| 2008/0218582 A1 | 9/2008 | Buckler |
| 2008/0246834 A1 | 10/2008 | Lunde et al. |
| 2008/0267282 A1 | 10/2008 | Kalipatnapu et al. |
| 2008/0316297 A1 | 12/2008 | King et al. |
| 2009/0045987 A1 | 2/2009 | Cho et al. |
| 2009/0079811 A1 | 3/2009 | Brandt |
| 2009/0164575 A1 | 6/2009 | Barbeau et al. |
| 2009/0174764 A1 | 7/2009 | Chadha et al. |
| 2010/0091086 A1 | 4/2010 | Hagen |
| 2010/0141655 A1 | 6/2010 | Belinsky et al. |
| 2010/0271457 A1 | 10/2010 | Thapa |
| 2010/0302446 A1 | 12/2010 | Mauchly et al. |
| 2011/0018962 A1 | 1/2011 | Lin et al. |
| 2011/0040562 A1 | 2/2011 | Doyle et al. |
| 2011/0074910 A1 | 3/2011 | King et al. |
| 2011/0074913 A1 | 3/2011 | Kulkarni et al. |
| 2011/0131144 A1 | 6/2011 | Ashour et al. |
| 2011/0141221 A1 | 6/2011 | Satterlee et al. |
| 2011/0205332 A1 | 8/2011 | Jeong et al. |
| 2011/0206113 A1 | 8/2011 | Bivolarsky et al. |
| 2013/0176383 A1 | 7/2013 | Satterlee et al. |
| 2013/0346564 A1 | 12/2013 | Warrick et al. |

FOREIGN PATENT DOCUMENTS

| | | |
|---|---|---|
| WO | WO2010111275 | 9/2010 |
| WO | WO2011150128 | 12/2011 |

OTHER PUBLICATIONS

Series H: Audiovisual and Multimedia Systems; Infrastructure of audiovisual services—Coding of moving video. H.264. Advanced video coding for generic audiovisual services. International Telecommunication Union. Version 11. Dated Mar. 2009.

Series H: Audiovisual and Multimedia Systems; Infrastructure of audiovisual services—Coding of moving video. H.264. Advanced video coding for generic audiovisual services. International Telecommunication Union. Version 12. Dated Mar. 2010.

Series H: Audiovisual and Multimedia Systems; Infrastructure of audiovisual services—Coding of moving video. H.264. Amendment 2: New profiles for professional applications. International Telecommunication Union. Dated Apr. 2007.

Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.

Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.

Series H: Audiovisual and Multimedia Systems; Infrastructure of audiovisual services—Coding of moving video; Advanced video coding for generic audiovisual services. H.264. Version 1. International Telecommunication Union. Dated May 2003.

Series H: Audiovisual and Multimedia Systems; Infrastructure of audiovisual services—Coding of moving video; Advanced video coding for generic audiovisual services. H.264. Version 3. International Telecommunication Union. Dated Mar. 2005.

VP6 Bitstream & Decoder Specification. Version 1.02. On2 Technologies, Inc. Dated Aug. 17, 2006.

VP6 Bitstream & Decoder Specification. Version 1.03. On2 Technologies, Inc. Dated Oct. 29, 2007.

Babonneau, et al., "SSRC Multiplexing for Unicast and Multicast RTP Sessions," Network Working Group Internet-Draft (IETF Trust 2010).

Schulzrinne, H., et al. RTP: A Transport Portocol for Real-Time Applications, RFC 3550. The Internet Society. Jul. 2003.

Firestone, S., et al. "Lip Synchronization in Video Conferencing." Voice and Video Conferencing Fundamentals. Cisco Systems, Inc. Mar. 2007.

EP Search Report for EP Application No. 10188901.2 dated Jun. 9, 2011.

\* cited by examiner

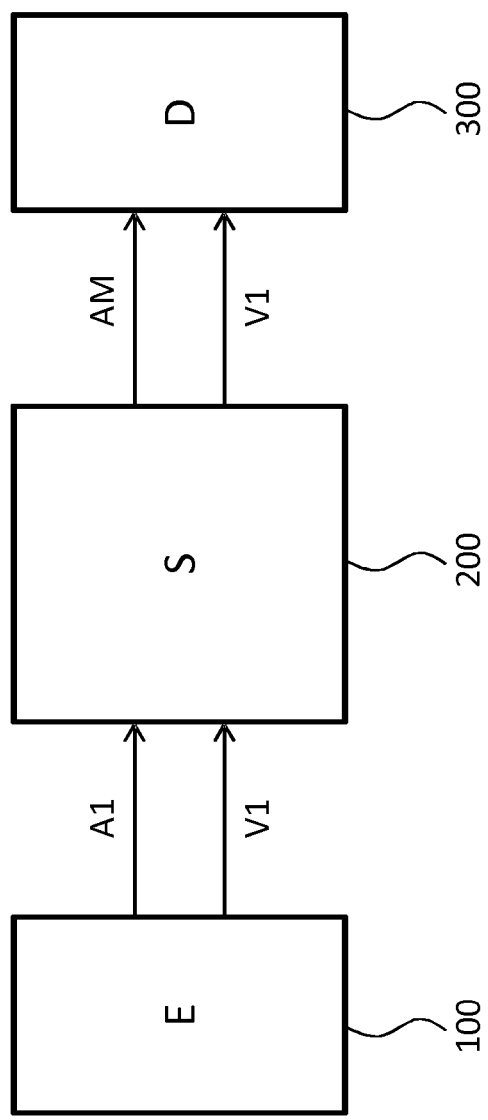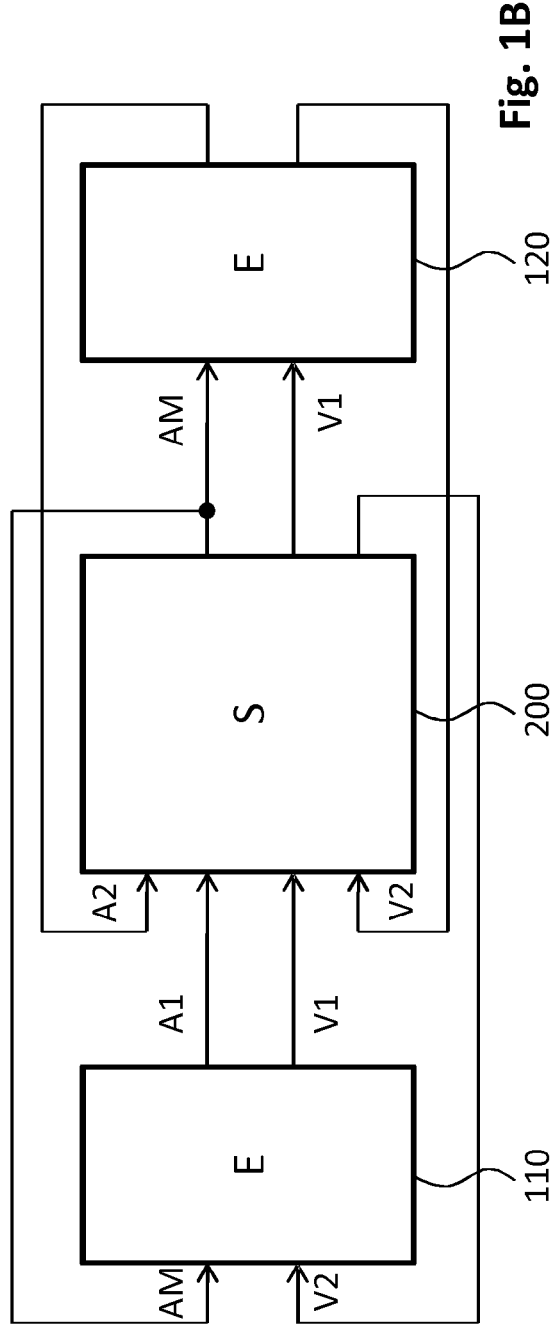

LIP SYNCHRONIZATION IN A VIDEO CONFERENCE

CROSS-REFERENCE TO RELATED APPLICATIONS

This application claims priority to U.S. Provisional Application Ser. No. 61/406,799, filed Oct. 26, 2010 and EP Application No. 10188901.2, filed Oct. 26, 2010, both of which are incorporated herein by reference in their entireties.

TECHNICAL FIELD

The invention disclosed herein generally relates to the field of real-time data distribution and more precisely relates to methods and devices for synchronizing streams of data packets in a multimedia session over a packet-switched communications network. In particular, the invention provides techniques for lip synchronization in a video conference.

BACKGROUND

In real-time multimedia sessions over packet-switched communication networks, data in the different channels can be transmitted in separate streams. It may be desirable to preserve synchronicity of the channels, so that the offset between arbitrary reference points in a pair of streams is kept constant between source end and receiver end, irrespective of the delays experienced by the respective streams.

SUMMARY

Embodiments of methods of enabling synchronization of a plurality of data streams having time-stamped packets wherein the plurality of data streams are of a first type and at least a second type different than the first type, of which at least one stream of the first type is to be processed at a server are disclosed herein. In one aspect, a method includes re-dating a timestamp of a packet, using a processor, based on an estimated relative delay for transport up to the server between first-type and second-type streams and a predicted relative delay representative of a processing time duration between first-type and second-type streams, thereby allowing the relative delays to cancel at least partially.

Embodiments of apparatuses for handling a plurality of data streams of time-stamped packets are also disclosed herein. In one aspect, an apparatus includes a first receiving means for receiving packets in streams of a first type due to be processed and a second receiving means for receiving packets in streams of a second type different than the first type. The apparatus also includes a relaying means for re-dating timestamps of packets in streams of at least one of the first and second types, on the basis of a predicted relative delay representative of processing duration difference between first-type and second-type streams and an estimated relative delay for transport up to the apparatus between first-type and second-type stream s, thereby allowing the relative delays to cancel at least partially.

Embodiments of apparatuses for enabling synchronization of a plurality of data streams having time-stamped packets, where the plurality of data streams are of a first type and at least a second type different than the first type, of which at least one stream of the first type is to be processed at a server are also disclosed. In one aspect, an apparatus includes a memory; and a processor configured to execute instructions stored in the memory to: re-date a timestamp of a packet based on an estimated relative delay for transport up to the server between first-type and second-type streams and a predicted relative delay representative of a processing duration difference between first-type and second-type streams s, thereby allowing the relative delays to cancel at least partially.

These and other embodiments will be described in additional detail hereafter.

BRIEF DESCRIPTION OF THE DRAWINGS

This and other aspects of the present invention will now be described in more detail with reference to the appended drawings, on which:

FIG. 1 is a generalized block diagram of three entities for handling media streams in a communications network;

DETAILED DESCRIPTION OF EMBODIMENTS

Figure 2:
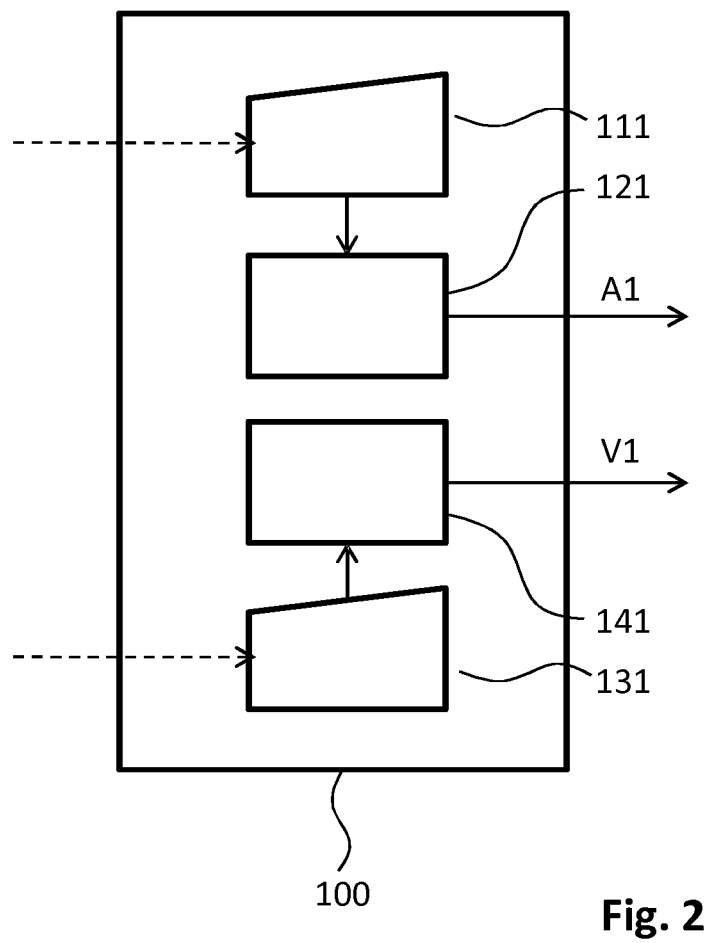
FIG. 2 is a detailed view of an encoder of the general type shown in FIG. 1.

As discussed previously, in real-time multimedia sessions over packet-switched communication networks, data in the different channels can be transmitted in separate streams and it may be desirable to preserve synchronicity of those channels.

In current synchronization techniques, a stream of data packets carrying the payload may be accompanied by a stream of control packets. As an example of one current technique, the Real-time Transport Protocol (see H. Schulzrinne et al., *RTP: A Transport Protocol for Real-Time Applications*, RFC 3550, 2003) provides a stream of data packets (RTP packets) and a parallel, optional stream of control packets, which can be transmitted less frequently than data packets and can occupy less than 5% of the bandwidth allocated to data packets. The control packets can be used for monitoring quality variables but may also include timestamps for enhanced synchronization of the streams. For example, the timestamps carried by the control packets may be used to calibrate other timestamps expressed in local time (device time) against a reference time if such is available.

In another current technique, for example as described in U.S. Pat. No. 7,664,057, a server can generate a multimedia session by mixing source signals "remotely" (in the sense that non-negligible transmission delays are experienced) from both the source site and the receiver site. The server under consideration can preserve timestamps through the mixing operation, and U.S. Pat. No. 7,664,057 provides a mechanism where the output streams include synchronization data correlating the mixed stream to the source signals without having access to a global reference time.

Other current techniques (see, e.g, chapter 7 of S. Firestone et al., Voice and Video Conferencing Fundamentals, Cisco Press, March 2007) such as poor man's lip sync, involve delaying 'faster' streams to achieve synchronization with 'slower' streams. In one application, for example, the faster streams can be delayed by a constant period approximating the relative offset of the streams. In another application, rather than a constant period, a delay by the true relative offset can be used. In some instances, however, the true relative offset will not be known until processing of the slowest stream has been completed. Hence, before completion of the processing of the slowest stream, only approximate synchronizing measures can be taken.

In a remote node for decoding, processing and recoding a packet stream in real time, it may be difficult to relate the timestamp information to the decoded content of the data packets. Hence, the information otherwise encoded in the timestamps may not be available, at least not with sufficient accuracy, for use in later synchronization. Particular difficulties may be encountered in connection with transform-based media coding techniques that use overlapping time windows, variable-length time windows, and/or state-dependent coding methods such as prediction coding. It may not be possible to establish a correspondence between input packets (with timestamps) and output packets (to be provided with timestamps enabling synchronization), as input packets do not in general contribute to output packets in a one-to-one relationship.

The embodiments of the invention provide improved synchronization techniques. These embodiments can handle streams of data packets, which may include processing and transmission operations, while preserving synchronicity of the streams.

FIG. 1A is a generalized block diagram including a transmitting node 100, a server (S) 200 in accordance with an embodiment of the invention and a receiving node 300. The transmitting node 100 may be operated by a contributor and may include an encoder (E). The receiving node may be operated by an end user and may include a decoder (D). The transmitting node 100 transmits two streams of data packets A1, V1 of two different types. In embodiments adapted for handling streams of both data packets and accompanying control packets, the transmitting node 100 can transmit control packets (not shown) to the server 200. The streams can be intrinsically synchronous, as explained above. The server 200 can process the first stream A1 to obtain a processed stream AM and relay (without any processing or with a less time-consuming processing) the second stream V1. The processed stream AM (of the first type) and the relayed stream (of the second type) are transmitted from the server 200 to the receiver 300.

FIG. 1B is similar to FIG. 1A but illustrates a setup where two participant nodes (E) 110, 120 communicate with one another via a server (S) 200 in accordance with an embodiment of the invention (e.g., during a video conference). Each participant 110, 120 can both transmit and receive streams of data packets. At least some of the information each participant 110, 120 receives from the server 200 can be based on information which the server 200 has received from the other participant node 110, 120. More precisely, both participant nodes 110, 120 can receive a processed stream AM, which has been generated by processing for non-negligible time $\delta_M$ on the basis of two streams A1, A2 of the first type provided by the participant nodes 110, 120. On the other hand, the server 200 can relay a first stream V1 of data packets of a second type from the first participant 110 to the second participant 120, and can relay a second stream V2 from the second participant 120 to the first participant 110. As will be further explained below, the action of relaying can be associated with a re-dating of any packets that accompany the respective streams of data packets of the second type. In embodiments adapted for handling streams of both data packets and accompanying control packets, the control packets can be re-dated before being relayed.

FIG. 2 illustrates the transmitting node 100 of FIG. 1A in greater detail. The node 100 can include first and second transducers 111, 131 for converting an external excitation supplied to it, such as an optic or acoustic wave, into a signal carrying information regarding the character and magnitude of the excitation. One or more of these transducers (or capturing devices or sampling devices) may, for instance, be an imaging device or a microphone. Other types of transducers are also available. The transducers 111, 131 are connected to encoders 121, 141, respectively, for converting each signal into a stream A1, V1 of data packets or some other format suitable for transmission over the communication network.

To enable synchronization, each data packet can carry a timestamp, which may, for instance, relate to the sampling instant of the first octet in the data packet. The sampling instant can be expressed in terms of a sampling-device time. In one embodiment, each stream (sub-stream) of data packets can be accompanied by one or more control packets indicating a correspondence between the sampling-device time and either a source-device time or a (global) reference clock time, by forming pairs of a value of the sampling-device time and a value of the other clock time (i.e., local or device-independent clock). A value of the source-device time appearing in a control packet need not coincide with a timestamp of a data packet, but may relate to an intermediate instant, such as the instant the control packet was generated. As an alternative, a control packet may define the correspondence in terms of a data packet number associated with a source-device clock time. Since the relevant data packet also carries a timestamp making reference to the sampling-device time, the correspondence between the latter and the source-device clock time can be readily established. In the following description, the time value carried by a control packet will be referred to as the timestamp of that packet. In other embodiments, the time value can also refer to other values independent of the timestamp of the packet.

Figure 4:
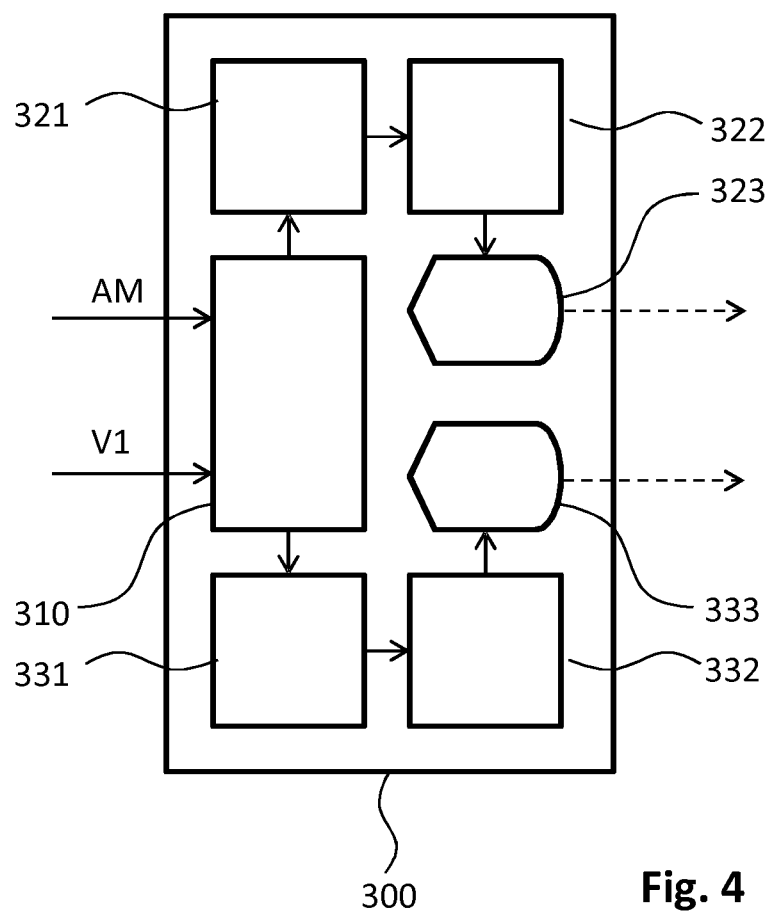
FIG. 4 is a detailed view of a decoder of the general type shown in FIG. 1.

FIG. 4 illustrates the receiving node 300 of FIG. 1A in greater detail. Both incoming streams AM, V1 of data packets are received at a receiving interface 310, which provides each of these to a processing chain which includes, respectively, buffers 321, 331, decoders 322, 332 and playback devices 323, 333. The receiving node 300 can be configured to play data packets of the two streams as synchronously as possible. More precisely, the receiving node 300 can be configured to match data packets (identified by numbers or source-device timestamps) to the points in reference time that the control-packet timestamps indicate and attempt to keep the (reference) time difference between such data packets that are being played simultaneously as small as possible. The receiving node 300 may perform interpolation, catch-up or other procedures for enhancing time synchronicity. In this context, control packets originating from difference source devices can carry timestamps referring to a common reference time, e.g., a server-clock time. However, other suitable techniques are available to achieve at least partial synchronicity even in the absence of a common reference time.

Figure 3:
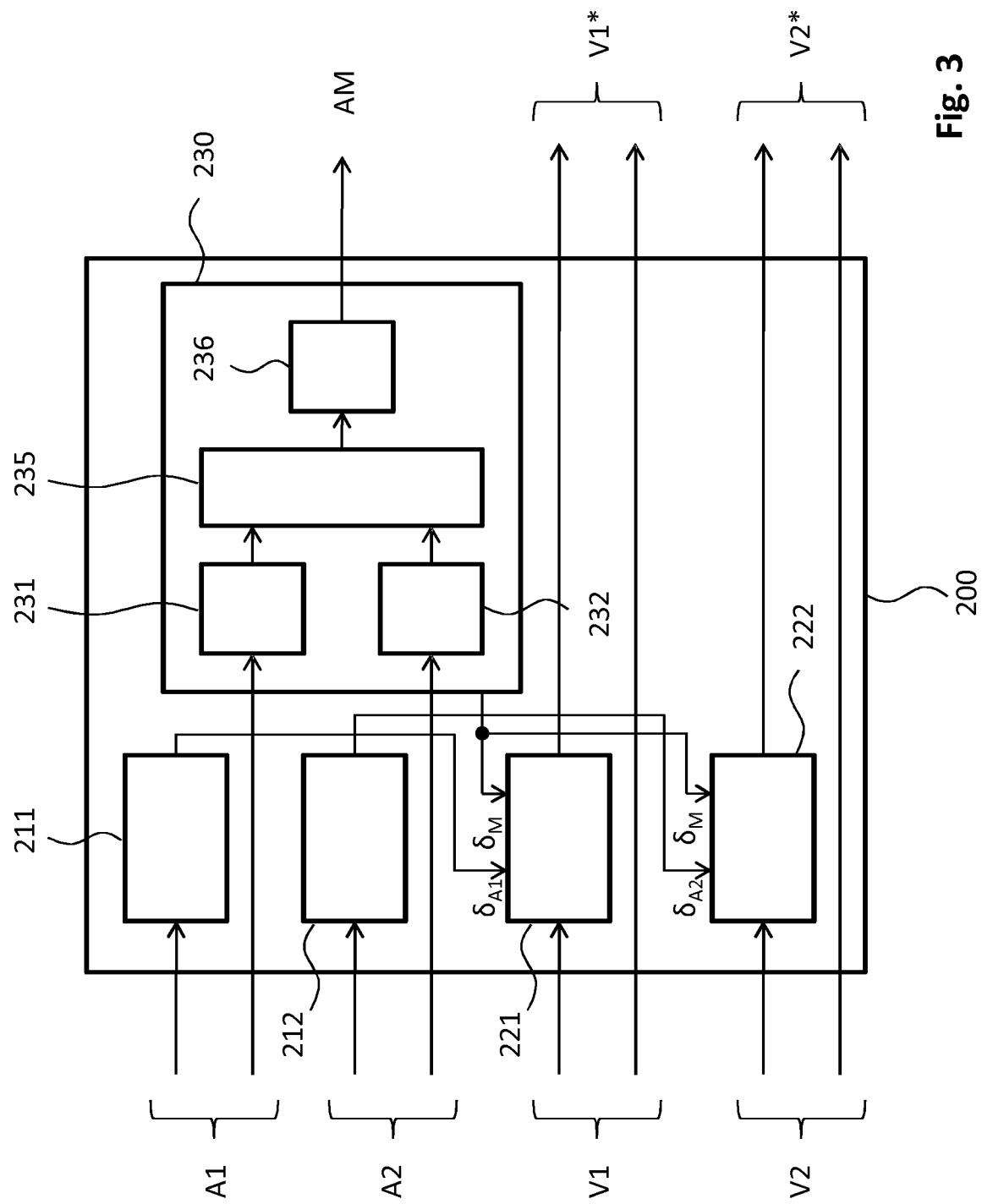
FIG. 3 is a detailed view of a server of the general type shown in FIG. 1.

FIG. 3 is a detailed view of the server 200 of FIG. 1B. The server receives two first-type streams A1, A2 and two second-type streams V1, V2 and provides as output a processed first-type stream AM and two re-dated second-type streams V1*, V2*. Each of the seven streams of data packets is accompanied by control packets, wherein the server 200 generates the control packets accompanying the processed stream AM and has amended or substituted the control packets accompanying the re-dated streams V1*, V2*. In this embodiment, the control packets constitute the only difference between the second-type streams V1, V1* and V2, V2* before and after re-dating.

Receiving units 211, 212 can receive control packets accompanying the first-type streams A1, A2 and can compute an estimated transport time $\delta_{A1}, \delta_{A2}$ for each control packet. The estimated transport time can be computed as the difference between the timestamp carried by the control packet and the receipt time of the control packet. Even in cases where the timestamp refers to the instant of generation in source-device time and the receipt time is measured in server time, the difference between transport times estimated in this manner can be an approximation of the true transport delay, since systematic errors cancel out. In the general case, the control packets are not transmitted past the receiving units 211, 212, and the estimated transport times $\delta_{A1}, \delta_{A2}$ can be the only output.

The streams of data packets can be provided to a processing unit 230 which can include combined buffer and decoder units 231, 232, which can receive the first and second first-type stream, respectively. The decoded signals from each of these units 231, 232 can be provided to a signal processor 235, the output of which can be one, non-encoded signal. The buffer and decoder units 231, 232 may need to buffer the decoded signals so as to smoothen out network jitter. Yet, in the case of asynchronous processing (see above), buffering may not be necessary to achieve synchronicity. The output signal from the signal processor 235 is fed to an encoder 236, which can convert the signal to data packets in a format suitable for transmission over the network. The encoder 236 can also ensure that this stream of data packets is accompanied by control packets. The control packets may carry a timestamp referring to a reference time being a server-clock time, and a data packet number referring to the packet encoded at this instant in reference time. As an alternative, the control packets may carry a timestamp in a global reference time and a synchronous internal encoder-clock time. Either way, the receiving node 300 can derive the reference clock time value characterizing each data packet, so that synchronous playback is possible.

The server 200 also includes a second group of receiving units 221, 222 configured to handle data packets accompanying second-type streams of data packets. In this embodiment, the receiving units 221, 222 can read off the timestamp of the control packets, for re-dating the control packets and for relaying them. This embodiment involves explicit estimates of a transport time $\delta_{A1}, \delta_{A2}$ for each stream of the first type (see below for a discussion on ways of estimating the transport times), which can be fed from the first group of receiving units 211, 212 to respective receiving units 221, 222 in the second group. Further, the processing unit 230 provides a prediction $\delta_M$ of the current processing time to each of the receiving units 221, 222 in the second group. By further having access to the reference clock time (server-clock time or global reference time, as noted above), each of the receiving units 221, 222 can re-date a control packet accompanying a first-type stream so that it has the new timestamp $t_c + \delta_M + \delta_{A1} - \delta_{V1}$. Here, $t_c$ is the time instant in reference time at which the control packet is amended. Similarly, a control packet accompanying a second-type stream will have the new timestamp $t_c + \delta_M + \delta_{A2} - \delta_{V2}$. Thus, all control packets accompanying a relayed second-type stream of data packets will have been re-dated.

Figure 5:
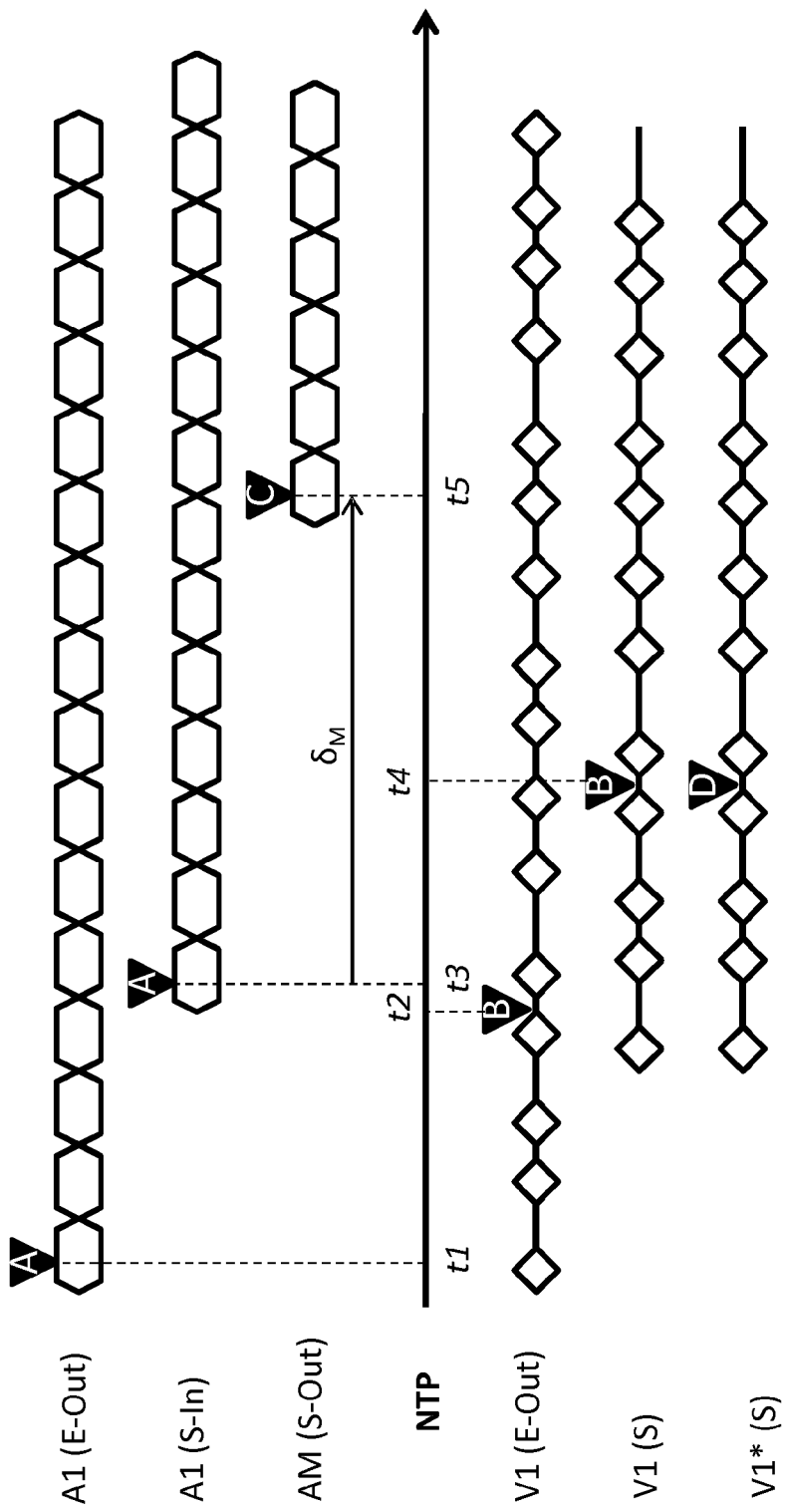
FIG. 5 illustrates two streams of data packets, their relative time shifts at different points in the network and the locations and values of accompanying control packets.

FIG. 5 illustrates two streams of data packets, one stream A1 of the first type and one stream V1 of the second type. By way of example only, the first-type stream can contain data packets intended for being played over an extended time interval (e.g., audio segments with a duration on the millisecond scale), while the second-type stream can contain data packets suitable for point-wise rendering (e.g., video frames). In FIG. 5, the streams have been drawn according to their time positions relative to a (imaginary) global reference-clock timeline. The first-type stream A1 has been drawn at two different locations separated by time intervals—at the output from an encoder and at the input to a server (after transmission)—and therefore shifts rightward along the timeline. Further, a processed stream AM is shown at the output from the server, and so the processed stream is shifted rightward by the duration $\delta_M$ of processing. Similarly, the second-type stream V1 has been drawn at the encoder output and at the server input (after transmission). A second-type stream V1*, which contains the same data packets as the original second-type stream V1 but re-dated control packets, is shown at the server. Since the process of re-dating incurs a negligible time delay, the two second-type streams V1, V1* are not drawn shifted.

Several points in time have been indicated on the timeline in FIG. 5. Here, the label t1 refers to the instant at which a control packet A accompanying the first-type stream is generated. Similarly, t2 refers to the instant at which a control packet B is generated. In this example, the timestamp of a control packet is defined as the instant of generation, and so control packets A and B carry timestamps t1 and t2, respectively. Labels t3 and t4 refer to the respective receipt times of control packets A and B. When both control packets have been received, packet A is t4−t1 time units old, while packet B is t4−t2 time units old. According to their timestamps, the age difference of the packets before processing and re-dating is therefore t2−t1.

The data packets in the first-type stream can then be decoded and processed, while the control packets, including packet A, are discarded. At time t5, a new control packet C is generated to accompany the processed stream AM. In this example, the new control packet C is located approximately at the same location as the discarded control packet A (which implies that $t3 + \delta_M = t5$), which is however not essential to the functioning of the re-dating concept. The control packet B accompanying the second-type stream is replaced by (or amended into) a control packet D carrying the timestamp t4 when it was generated adjusted by an added quantity according to the following equation:

$$\text{Diff} V = -t1 + t2 + t3 - t4 + \delta_M; \text{ wherein}$$

$\delta_M$ in this expression denotes the predicted processing time. In some instances circumstances, the first portion of this expression can be computed as a difference in transport times (i.e., t3−t1 subtracted by t4−t2). Alternatively, the first portion of the expression may be computed as a change in the time shift separating a first-type and a second-type control packet between the encoder output and the server input (i.e., by subtracting t4−t3 from t2−t1.) With regard to the timestamps, the age of control packet C immediately after its creation will be t5−t5=0, while the age of the re-dated control packet D will be $t5 - (-t1 + t2 + t3 + \delta_M) = t1 - t2$. Hence, the age difference is preserved.

The heuristic verification of the age difference can be easier to carry out where the locations of control packets A and C have been chosen equal. However, the re-dating refers to the streams as a continuous flows, and corresponding calculations will show that the second-type stream can be correctly re-dated even if the locations of control packets accompanying the processed stream do not match those of its input stream or streams.

As others skilled in the art will readily appreciate, the re-dating process described hereinabove is equally applicable to the case of having a plurality of first-type and/or second-type streams. The re-dating process can be carried out without modification when several first-type streams are processed asynchronously, and no buffering time to achieve pre-processing alignment need be taken into account.

Embodiments of the invention may also be embodied as a re-dating method to compensate delays occurring in synchronous processing of pair-wise synchronous streams. Synchronous processing entails aligning the first-type streams of data packets upstream of the processing means, so that the latter receives packets of the same age (according to their timestamps) as input. In the particular example of audio mixing in a video conference, this can amount to translating real-world synchronicity between speakers into synchronicity in the mixed audio signal. The aligning of first-type stream happens at the cost of delaying the $n^{th}$ data packet by an additional amount $(\max_k \delta_{Ak}) - \delta_{An}$. All data packets except the one latest delivered can be delayed. When this amount is added to the earlier expression $t_c + \delta_M + \delta_{An} - \delta_{Vn}$, a re-dated control packet in the $n^{th}$ second-type stream can carry $t_c + \delta_M + (\max_k \delta_{Ak}) - \delta_{Vn}$ as its timestamp. More specifically, this timestamp can be the sum of a current reference time, the predicted processing time in the processing means and the maximum estimated transport time for a stream of the first type subtracted by the estimated transport time of the $n^{th}$ stream of the second type.

Embodiments of the invention can be useful for handling of several streams processed by different operations, causing different processing times and thereby incurring a relative processing delay. The embodiments can also be useful together with processing at a network node (server) which can be an intermediate node between a source node and a client node. A network node may receive input streams from different source nodes at different points in time because of variations in transport times, thereby causing a relative transport delay between the input streams. Further, in a network node that is not a client node, it may be unsuitable to withhold (i.e., delay sending of) a stream not due to be processed or an output stream longer than necessary. Indeed, such delayed sending may imply that the streams are more sensitive to transport delays downstream of the network node (server).

The re-dating provided by the embodiments takes into account the relative transport delay (or jitter) that is at hand between packet streams of two different types, as well as the expected or predicted difference in processing times between the streams (which will in the sequel be referred to as the relative processing delay). The relative processing delay may correspond to the processing time itself since streams of a first type may be processed while streams of a second type may not be processed at all. The embodiments of the present invention are advantageous in that they provide for compensation of these two delays jointly. Indeed, the re-dating provides a possible cancellation of the two relative delays. As discussed above, some current methods re-date the streams that are to be relayed by increasing their timestamps by an estimated relative processing delay. If a favourable relative transport delay (that is, one that wholly or partially cancels the processing delay) is present, be it only intermittently, then the timestamp increase may be superfluous and only extends the necessary handling time in the server.

A further advantage of some embodiments is, for example, reliance on a predicted processing delay. Since the outcomes of one or more actual processing operations need not be waited for, re-dating may be the only step that the server carries out on a second-type stream. Likewise, the second-type packets may undergo a shorter processing operation than first-type packets, and once the second-type packets have been duly re-dated, they can be dispatched from the server. Hence, these packets can be relayed without being withheld and consequently without occupying buffer memory. In particular, the packets can be relayed independently of the first-type packets, in other words, asynchronously. Immediate relaying enhances the timeliness of delivery to the receiving end of the streams, considering that non-processed packets of a first-type stream may experience unfortunate circumstances (network delays, packet losses requiring retransmission etc.) downstream of the server causing them to be delivered later than corresponding processed packets of a second-type stream. A similar line of reasoning is valid in the case where first-type packets are processed relatively longer and second-type packets are processed relatively shorter. The prediction of the processing time can be refreshed very frequently, for example, by feedback from past processing times, and can thus be made quite accurate.

Furthermore, embodiments of the invention may be used to transfer a time relationship (e.g., a synchronicity) that exists between input streams into a corresponding time relationship between output streams. This may also be achieved in a situation where an output stream is derived from one or more input streams.

The embodiments may not only be applicable to streams that are either processed or relayed, but may also improve synchronicity of streams which undergo different types of processing, particularly if the different types of processing are expected require different processing times. The term "relative processing delay" has been employed irrespective of whether both or only one stream type is due to be processed, and the term "relayed" can include being processed by a less time-consuming scheme than a "processed" stream is. "Processing time" can be the time elapsing from the instant that a point in a data-packet stream is input (or received) for processing until the corresponding point is output (or sent) in a processed stream. Hence, a predicted processing time can attempt to quantify the delay incurred by the processing when this is considered alone.

Further, "transport time" can refer to the time required to transmit a data packet from a source device to a network site where the packet is due to be processed. It may not be possible to accurately estimate the transport time of a time-stamped packet since an unknown period may have elapsed between the time-stamping instant and the dispatch of the packet. However, a difference in transport times—a relative transport delay—between two streams sent from the same source can often be estimated with good accuracy at receipt of a packet for each stream.

Moreover, the action of "re-dating" a timestamp may consist in amending (i.e., time-shifting the value of) a time field in an existing packet. The time field may be located in a header of the packet, such as an RTP header. It may also include substituting a new packet with a shifted timestamp (but otherwise substantially unchanged payload) for an existing packet.

In one embodiment, the server may perform not only re-dating (and, possibly, relaying), but also carries out processing. This way, both types of streams are handled by the same server, which means that information for estimating differences in transport times and the predicted processing time is conveniently at hand, at negligible retrieval time.

In another embodiment, the transport time may be estimated as the period elapsed from the timestamp to a receipt time. This is a simple but possibly efficient way of estimating the relative transport delay. Other choices include, firstly, the time elapsing from the instant of acquisition (e.g., acquisition of an audio segment or image frame) or, secondly, the time elapsing from the actual dispatch of the packet. Although these estimates may not agree with the actual transport time, they allow a faithful estimation of the difference in transport times, since errors cancel out. In particular, the difference in transport times can be estimated by studying how a time difference between two specific packets belonging to different streams varies from the instant of generation (or acquisition, or dispatch) and the instant of receipt at the server.

In another embodiment, at least one stream of a first type can be processed to obtain at least one processed stream of time-stamped data packets. Further, the processed stream may be obtained by processing two or more streams of the first type. The processing may comprise mixing, adding, modulating, subtracting, moving-averaging or some other multiple-input-single-output processing. The embodiments may be used to solve the problem of maintaining an original synchronicity between input streams past a step or stage (e.g., a server) in which some of the streams are processed and other not. By re-dating the packets of some or all output streams, a synchronization of the output streams is ensured irrespective of whether they have been processed or not, or whether the processed streams have been subjected to comparable processing operations.

In another embodiment, at least some of the streams may be considered to belong to pairs comprising one stream of each type. Each pair is characterised by an intrinsic synchronicity. For instance, a pair of streams may be generated by an imaging device and a microphone that are co-located at the source, e.g., by being built-in devices in a personal computer or by being arranged in the same environment, particularly a studio or meeting room. The imaging device may generate a video stream and the microphone may generate an audio stream, that is, synchronous streams of two different types. A natural synchronicity will be preserved if the streams within a pair are reproduced at a receiving end so that given points maintain, at the source, the same time shift as they had at acquisition. Consequently, if a plurality of such pairs are fed to a server which processes some of the streams, then the embodiment can preserver the synchronicity within each pair. For this purpose, the re-dating is effected to synchronize a second-type stream with the contribution its associated first-type stream makes to the processed stream or streams. Either existing packets are amended or new packets, encoding otherwise unchanged information, are generated while old ones are deleted. The nature of the processing may determine the extent of the re-dating.

In another embodiment, the streams can include pairs of audio (first type) and video streams (second type) generated by pair-wise co-located source devices. Audio streams are processed while video streams are (directly) relayed. Hence, the embodiments can be adapted so that it preserves the synchronicity within each pair. If the subject to be rendered is a speaking or singing person, the embodiments may achieve a lip synchronization, i.e., a synchronization of the audio and video streams.

As a further development of the preceding embodiment, the audio streams may be processed by combination, that is, by being mixed together into one common stream. The streams may be added with equal or different weights and possibly with differences as to other parameters as well. Such processing may be useful in a video conference where the suitable output may be a mixture of sound from all speakers and a video image showing at least the currently speaking person. To achieve this, all audio streams from the participating sites may be sent to a server for mixing and then redistributed to all sites. Meanwhile, the video stream from each site may be sent out to the other sites, so that each of these may select what visual content to display, such as a mosaic image, a single-site image and/or a dual screen. It is noted that the mixing of video content can be less computationally demanding—and may be further streamlined by choosing a suitable, scalable coding format—than mixing of audio content, which is why centralized audio mixing may represent a computationally economical solution.

Other embodiments provide enabling synchronization of streams including a sub-stream of data packets and at least one control packet transmitted over the same sub-stream or out-of-band, separately from the data packets in a different sub-stream. As an addition to the timestamps in local time (device time) carried by the data packets, a control packet may include information associating a point in the stream of data packets with a point in time, which may be common to all sampling and/or encoding devices at the source. Alternatively, the time may refer to a source-device clock or server clock designated as global reference time, to a device-independent network wall clock, to a clock in accordance with the network time protocol (NTP) or to some other time signal accessible from the source devices. The point in the sub-stream of data packet may be a packet or portion of a packet or an interval between packets, and may be expressed by a frame number, packet number or a local timestamp referring to a clock of a sampling and/or encoding entity within the source device.

One option for generating a new control packet at a source device is to associate simultaneous or approximately simultaneous readings of a device-independent reference clock and of a source-device clock. The readings may refer to the instant at which the control packet is generated. Another option is to generate a control packet in parallel with a data packet, wherein the same reading of the source-device clock (or data packet serial number) is included in both packets and the control packet further includes a current reading of the global reference clock. In the latter case, it may be advantageous to compensate known or predicted delays in the source device that are due to encoding or transmission to the extent that these delays affect control packets and data packets differently. Still another option is to associate simultaneous or near-simultaneous readings of the source-device clock and a clock of a sampling and/or encoding entity within the source device. If the control packets carry associations between particular points in a data packet sub-stream and points in a reference time, this may enable a receiver device to align streams synchronously at playback.

In the setting of such streams of both data packets and control packets, the embodiments may provide a re-dating procedure which enables synchronization of streams which may be subject to respective processing operations of different durations. The re-dating is concerned with the control packets of the non-processed stream or streams. The re-dating may include amending (i.e., time-shifting) a timestamp field in existing control packets. It may also include substituting new control packets, having shifted timestamps, for existing control packets. As another alternative, the re-dating procedure may delete existing control packets and generate new ones located differently, that is, so that new timestamps are associated with points in the data-packet streams that do not necessarily coincide with existing control packets as regards their number or locations.

In another embodiment, the re-dating of a second-type stream may be performed by setting the timestamp of a control packet to $t_c+\delta_M+\delta_{A1}-\delta_{V1}$, where $t_c$ denotes the current time in reference time, $\delta_M$ is the predicted processing time (relative processing delay) and $\delta_{A1}-\delta_{V1}$ is the difference in transport times (relative transport delay), the amount by which the first-type stream lags the second-type stream. In this context, the reference time may refer to a server clock, to a device-independent network wall clock, to a clock in accordance with the network time protocol (NTP) or to some other time signal accessible from the server devices. Timestamps referring to one of these clock types can enable the receiving end to restore synchronicity between the received streams. As already noted, the control packet that is to carry this timestamp may be generated at the instant of re-dating or may be an existing one, the timestamp of which is amended. It is noted that the default choice of timestamp for a control packet accompanying a freshly generated data packet can be $t_c$ in reference time (e.g., server-clock time). Such re-dating of the control packet will preserve synchronicity. The difference in transport times can be estimated indirectly by considering how the time shift in a given set of first-type and second-type streams varies between different points in the communication network, such as from the source-device output interface to the server input interface.

In another embodiment, the re-dating of the control packets may be conformal to the Real-time Transport Protocol (RTP). This can permit seamless integration with many existing systems. In particular, the control packets referred to above may be conformal to a Sender Report (SR) RTCP packet, wherein the field NTP timestamp may carry the timestamp.

In another embodiment, at least one processed stream may be obtained by processing first-type streams while a non-processed stream of the second type is (only and directly) relayed. Each stream may comprise a sub-stream of data packets and a sub-streams of control packets. In this present embodiment, synchronization may be enabled by re-dating control packets in the second-type stream.

In another embodiment, there may be two or more streams of the second type. Each of these streams may be output while being accompanied by a re-dated control packet so as to preserve their synchronicity.

As one example, the processing may consist in substantially additive mixing of all first-type streams in accordance with their arrival times. That is, the device responsible for mixing may not actively restore the physical time synchronicity between the source devices which generate the first-type streams. Such processing may be referred to as asynchronous. Here, the re-dating of the control packets for second-type streams may take place at the initiation of the processing: when processing of a first-type data packet begins, its corresponding second-type control packet is re-dated to match the first-type control packet which is to be generated a little later, at time t5, to accompany a forthcoming data packet in the processed stream. The timestamp of the re-dated control packet can be set to a later instant than the time at which the re-dating takes place. To enable immediate relaying, however, instead of the true instant t5 at which processing is done, the re-dated control packet can use as its timestamp a predicted instant, which is in turn adjusted to account for jitter within the pair to which the second-type control packet belongs. If the second-type stream lags the first-type stream, the new timestamp can be set to an even later instant. If the first-type stream lags the other, the re-dating will result in a slightly earlier new timestamp.

Other embodiments of the invention are also possible. For example, the embodiments disclosed in this application may be varied by carrying out backward re-dating of control packets for a processed stream (that is, by subtracting the quantity DiffV) in lieu of forward re-dating control packets for non-processed streams. Indeed it is possible to preserve the correct synchronicity of the streams even after such inversion of the re-dating procedure.

The embodiments of the transmitting node 100, server 200, receiving node 300 and/or participant nodes 200 (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting node 100, server 200, receiving node 300 and/or participant nodes 200 do not necessarily have to be implemented in the same manner.

Further, in one embodiment, for example, the transmitting node 100, server 200, receiving node 300 and/or participant nodes 200 can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

Further, all or a portion of embodiments of the present invention can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method of synchronizing a plurality of data streams having time-stamped packets, wherein the plurality of data streams are of a first type and at least a second type different than the first type, of which at least one stream of the first type is to be processed at a server, the method comprising:

re-dating a timestamp of a packet, using a processor, based on an estimated relative delay for transport up to the server between first-type and second-type streams and a predicted relative delay representative of a processing duration difference between first-type and second-type streams, thereby allowing the relative delays to cancel at least partially.

2. The method of claim 1, further comprising:

processing the at least one stream of the first type to obtain at least one processed stream of time-stamped data packets, wherein at least one of a data packet in the at least one processed stream or a data packet in a second-type stream is re-dated.

3. The method of claim 2, wherein the at least one stream of the first type includes two first-type streams and wherein the two first-type streams are processed to obtain the at least one processed stream of time-stamped data packets.

4. The method of claim 1, further comprising:
relaying packets of the first-type and second-type streams independently of one another.

5. The method of claim 1, wherein the relative transport delay is estimated as a difference between a first period, elapsed from a timestamp of a packet in a first-type stream to a receipt time of this packet, and a second period, elapsed from a timestamp of a packet in a second-type stream to a receipt time of this packet.

6. The method of claim 1, wherein:
the streams are ordered in synchronous pairs, each pair includes a first-type stream and a second-type stream;
first-type streams are to be processed to obtain a processed stream; and
timestamps in packets of each second-type stream are re-dated, to preserve synchronicity of the stream and a contribution to the processed stream made by the first-type stream of the pair, and these packets are relayed.

7. The method of claim 1, wherein the first type is audio and the second type is video, and wherein streams of the first type are to be processed by combination.

8. The method of claim 1, wherein each stream includes a sub-stream of data packets and an accompanying sub-stream of control packets including timestamps associating a point in the sub-stream of data packets with a point in time, wherein re-dating the timestamp of a packet comprises:
re-dating a timestamp of a control packet.

9. The method of claim 8, wherein:
the first-type streams are processed to generate a processed stream including a sub-stream of data packets and a sub-stream of control packets, each control packet carrying a timestamp associating a point in the sub-stream of data packets with a point in reference time at which this point in the sub-stream of data packets was obtained by processing; and
the re-dating includes setting a timestamp of a control packet accompanying a second-type stream to the sum of a current reference time, the relative processing delay and the relative transport delay between first-type and second-type streams.

10. A apparatus for handling a plurality of data streams of time-stamped packets, comprising:
a first receiving means for receiving packets in streams of a first type to be processed;
a second receiving means for receiving packets in streams of a second type different than the first type; and
a relaying means for re-dating timestamps of packets in streams of at least one of the first and second types, on the basis of a predicted relative delay representative of processing time duration difference between first-type and second-type streams and an estimated relative delay for transport up to the apparatus between first-type and second-type streams, thereby allowing the relative delays to cancel at least partially.

11. The apparatus of claim 10, further comprising:
a processing means for inputting at least one stream of the first type and for outputting a processed stream,
wherein the relaying means is configured to relay packets in streams of the one type after completion of re-dating.

12. The apparatus of claim 10, wherein:
the first and second receiving means record receipt times of control packets; and
the relaying means estimates the relative transport delay as a difference between a first period, elapsed from a timestamp to a receipt time of a packet in a first-type stream, and a second period, elapsed from a timestamp to a receipt time of a packet in a second-type stream.

13. The apparatus of claim 10, wherein the apparatus is configured to handle synchronous pairs of streams, each synchronous pair of streams including a first-type stream and a second-type stream, wherein:
the processing means processes first-type streams to obtain a processed stream; and
the relaying means re-dates timestamps in packets of each second-type stream, to preserve synchronicity of the stream and a contribution to the processed stream made by the first-type stream of the pair, and to relay packets with re-dated timestamps.

14. The apparatus of claim 13, wherein the apparatus is configured to handle streams each including a sub-stream of data packets and an accompanying sub-stream of control packets including timestamps each associating a point in the sub-stream of data packets with a point in time,
wherein the relaying means re-dates timestamps of control packets.

15. An apparatus for enabling synchronization of a plurality of data streams having time-stamped packets, wherein the plurality of data streams are of a first type and at least a second type different than the first type, of which at least one stream of the first type is due to be processed at a server, the apparatus comprising:
a memory; and
a processor configured to execute instructions stored in the memory to:
re-date a timestamp of a packet based on an estimated relative delay for transport up to the server between first-type and second-type streams and a predicted relative delay representative of a processing time difference between first-type and second-type streams.

16. The apparatus of claim 15, wherein the processor is further configured to:
process the at least one stream of the first type to obtain at least one processed stream of time-stamped data packets,
wherein at least one of a data packet in the at least one processed stream or a data packet in a second-type stream is re-dated.

17. The apparatus of claim 16, wherein the at least one stream of the first type includes two first-type streams and wherein the two first-type streams are processed to obtain the at least one processed stream of time-stamped data packets.

18. The apparatus of claim 15, wherein the processor is further configured to:
relay packets of the first-type and second-type streams independently of one another.

19. The apparatus of claim 15, wherein the relative transport delay is estimated as a difference between a first period, elapsed from a timestamp of a packet in a first-type stream to a receipt time of this packet, and a second period, elapsed from a timestamp of a packet in a second-type stream to a receipt time of this packet.

20. The apparatus of claim 15, wherein:
the streams are ordered in synchronous pairs, each pair includes a first-type stream and a second-type stream;
first-type streams are due to be processed to obtain a processed stream; and
timestamps in packets of each second-type stream are re-dated, to preserve synchronicity of the stream and a contribution to the processed stream made by the first-type stream of the pair, and these packets are relayed.

* * * * *